United States Patent
Dhakal et al.

(10) Patent No.: US 9,693,319 B2
(45) Date of Patent: Jun. 27, 2017

(54) METHODS SYSTEMS, AND COMPUTER PROGRAM PRODUCTS FOR CALIBRATING AMPLITUDE HARDWARE-INDUCED DISTORTION IN A LONG TERM EVOLUTION (LTE) COMMUNICATIONS SYSTEM

(71) Applicant: Collision Communications, Inc., Portsmouth, NH (US)

(72) Inventors: Sagar Dhakal, Bedford, NH (US); Joseph Farkas, Merrimack, NH (US); Brandon Hombs, Merrimack, NH (US); Seyedmehdi S. Nokhodberiz, Nashua, NH (US)

(73) Assignee: COLLISION COMMUNICATIONS, INC., Peterborough, NH (US)

(*) Notice: Subject to any disclaimer, the term of this patent is extended or adjusted under 35 U.S.C. 154(b) by 26 days.

(21) Appl. No.: 14/708,588

(22) Filed: May 11, 2015

(65) Prior Publication Data

US 2016/0337981 A1  Nov. 17, 2016

(51) Int. Cl.
| | |
|---|---|
| *H04B 1/00* | (2006.01) |
| *H04B 15/00* | (2006.01) |
| *H04W 52/24* | (2009.01) |
| *H04W 52/36* | (2009.01) |
| *H04B 17/13* | (2015.01) |
| *H04B 17/309* | (2015.01) |
| *H04B 1/04* | (2006.01) |

(52) U.S. Cl.
CPC .......... *H04W 52/242* (2013.01); *H04B 17/13* (2015.01); *H04B 17/309* (2015.01); *H04W 52/241* (2013.01); *H04W 52/365* (2013.01)

(58) Field of Classification Search
CPC ............ H04W 52/241; H04W 52/242; H04W 52/365; H04W 72/0473
USPC ............ 455/63.1, 67.11, 69, 450, 452.1, 522
See application file for complete search history.

(56) References Cited

U.S. PATENT DOCUMENTS

| | | |
|---|---|---|
| 5,530,449 A | 6/1996 | Wachs et al. |
| 2005/0047384 A1 | 3/2005 | Wax et al. |
| 2005/0141459 A1 | 6/2005 | Li et al. |
| 2011/0134774 A1* | 6/2011 | Pelletier .............. H04W 52/365 370/252 |
| 2011/0237244 A1* | 9/2011 | Hiltunen ............... H04W 16/16 455/423 |

(Continued)

OTHER PUBLICATIONS

"Evolved Universal Terrestrial Radio Access (E-UTRA); Physical Channels and Modulation," 3GPP TS 36.211 version 10.0.0 Release 10, (Jan. 2011) 105 pages.

(Continued)

*Primary Examiner* — Ayodeji Ayotunde (57) ABSTRACT

Methods and systems are described for calibrating amplitude hardware-induced distortion in a long term evolution (LTE) communications system. In one aspect, a power status indication is received at a base station (BS) associated with a centralized radio access network (C-RAN) of an LTE communications system from a user equipment (UE) communicating in the LTE communications system. A downlink pathloss associated with communications to the UE is estimated based on the received power status indication. Downlink power allocation is performed at the C-RAN based on the downlink pathloss estimates of one or more UEs.

22 Claims, 4 Drawing Sheets

(56) References Cited

U.S. PATENT DOCUMENTS

| | | |
|---|---|---|
| 2012/0300864 A1 | 11/2012 | Merlin et al. |
| 2013/0058424 A1 | 3/2013 | Enescu et al. |
| 2014/0269554 A1 | 9/2014 | Shapira et al. |
| 2015/0195795 A1* | 7/2015 | Loehr .................. H04W 52/06 455/522 |

OTHER PUBLICATIONS

"Evolved Universal Terrestrial Radio Access (E-UTRA); Physical Layer Procedures," 3GPP TS 36.213 version 10.1.0 Release 10, (Mar. 2011) 115 pages.

"Evolved Universal Terrestrial Radio Access (E-UTRA) User Equipment (UE) Radio Transmission and Reception," 3GPP TS 36.101 version 10.3.0 Release 10 (Jun. 2011) 236 pages.

Hou, X., et al., "Experimental Study of Advanced MU-MIMO Scheme With Antenna Calibration for the Evolving LTE TDD System," IEEE 23rd International Symposium on Personal Indoor and Mobile Radio Communications (PIMRC), Sep. 9-12, 2012, pp. 2443-2448.

Guey, J-C., et al., "Modeling and Evaluation of MIMO Systems Exploiting Channel Reciprocity in TDD Mode," Vehicular Technology Conference, 2004 VTC2004-Fall 2004 IEEE 60th, Sep. 26-29, 2004, vol. 6, pp. 4265-4269.

Burris, N.E., "Reciprocity Calibration of TDD Smart Antenna Systems," Antennas and Propagation Society International Symposium (APSURSI), Jul. 11-17, 2010, Toronto, Ontario, pp. 1-4.

Spencer, Q. H., et al., "Zero-Forcing Methods for Downlink Spatial Multiplexing in Multiuser MIMO Channels," IEEE Transactions on Signal Processing, vol. 52, No. 2, Feb. 2004, pp. 461-471.

Haghighat, A., "UE Calibration in MIMO Systems," Sep. 3-6, 2012, Vehicular Technology Conference (VTC Fall), 2012 IEEE, pp. 1-4.

* cited by examiner

METHODS SYSTEMS, AND COMPUTER PROGRAM PRODUCTS FOR CALIBRATING AMPLITUDE HARDWARE-INDUCED DISTORTION IN A LONG TERM EVOLUTION (LTE) COMMUNICATIONS SYSTEM

RELATED APPLICATIONS

This application is related to U.S. patent application Ser. No. 14/708,586, titled "METHODS, SYSTEMS, AND COMPUTER PROGRAM PRODUCTS FOR CALIBRATING PHASE HARDWARE-INDUCED DISTORTION IN A LONG TERM EVOLUTION COMMUNICATIONS SYSTEM," and U.S. patent application Ser. No. 14/708,595, titled "METHODS, SYSTEMS, AND COMPUTER PROGRAM PRODUCTS FOR CALIBRATING HARDWARE-INDUCED DISTORTION IN A COMMUNICATIONS SYSTEM," both filed on even date herewith, the entire disclosure of both of which are here incorporated by reference.

BACKGROUND

The 3GPP long term evolution (LTE) Rel. 8 and later standards define various transmission schemes for communication systems equipped with multiple transmit antennas and multiple receive antennas. Multi-user multiple input multiple output (MU-MIMO) is a set of advanced multiple-input and multiple-output, technologies where the available antennas are spread over a multitude of independent access points, such as base stations, and independent terminals—each having one or more antennas. To enhance the communication capabilities of all terminals, MU-MIMO applies an extended version of space-division multiple access (SDMA) to allow multiple transmitters to send separate signals and multiple receivers to receive separate signals simultaneously in the same band.

One transmission scheme is downlink beamforming, where multiple antennas at the enodeB (eNB), also referred to herein as a base station (BS), transmit to multiple user equipments (UEs) using the same time-frequency resource. The LTE Rel. 10 standard defines a codebook for up to eight transmit antennas per BS.

Beamforming is a signal processing technique involving directional signal transmission or reception. This is achieved by combining elements in a phased array in such a way that signals at particular angles experience constructive interference while others experience destructive interference. Beamforming can be used at both the transmitting and receiving ends in order to achieve spatial selectivity. In a centralized radio access network (C-RAN), multiple transmit antennas across multiple BS can be utilized to jointly beamform over a large geographic area. The C-RAN system has the potential to provide a significant gain in spectral efficiency and better network coverage. However, co-channel interference, if not efficiently controlled or cancelled, limits these advantages.

Channel state information (CSI), which refers to known channel properties of a communication link, can be used to control co-channel interference. This information describes how a signal propagates from the transmitter to the receiver and represents the combined effect of, for example, scattering, fading, and power decay with distance, making it possible to adapt transmissions to current channel conditions. CSI is typically estimated at the receiver and quantized and fed back to the transmitter.

A transmit beamforming algorithm can preemptively remove or reduce the interference in a MU-MIMO system. Block diagonalization and zero-forcing are two well-known beamforming techniques that utilize the downlink channel state information (DL-CSI) of users to perform linear precoding of their signals before transmission in order to cancel the co-channel interference. The performance of these beamforming techniques rely on the accuracy of the DL-CSI. Amplitude hardware-induced distortion that is introduced by BS transmit chains and UE receive chains, however, prevents an accurate determination of DL-CSI.

Accordingly, there exists a need for methods, systems, and computer program products for calibrating amplitude hardware-induced distortion in an LTE communications system.

SUMMARY

Methods and systems are described for calibrating amplitude hardware-induced distortion in an LTE communications system. In one aspect, a power status indication is received at a BS associated with a C-RAN of an LTE communications system from a UE communicating in the LTE communications system. A downlink pathloss associated with communications to the UE is estimated based on the received power status indication. Downlink power allocation is performed at the C-RAN based on the downlink pathloss estimates of one or more UEs.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
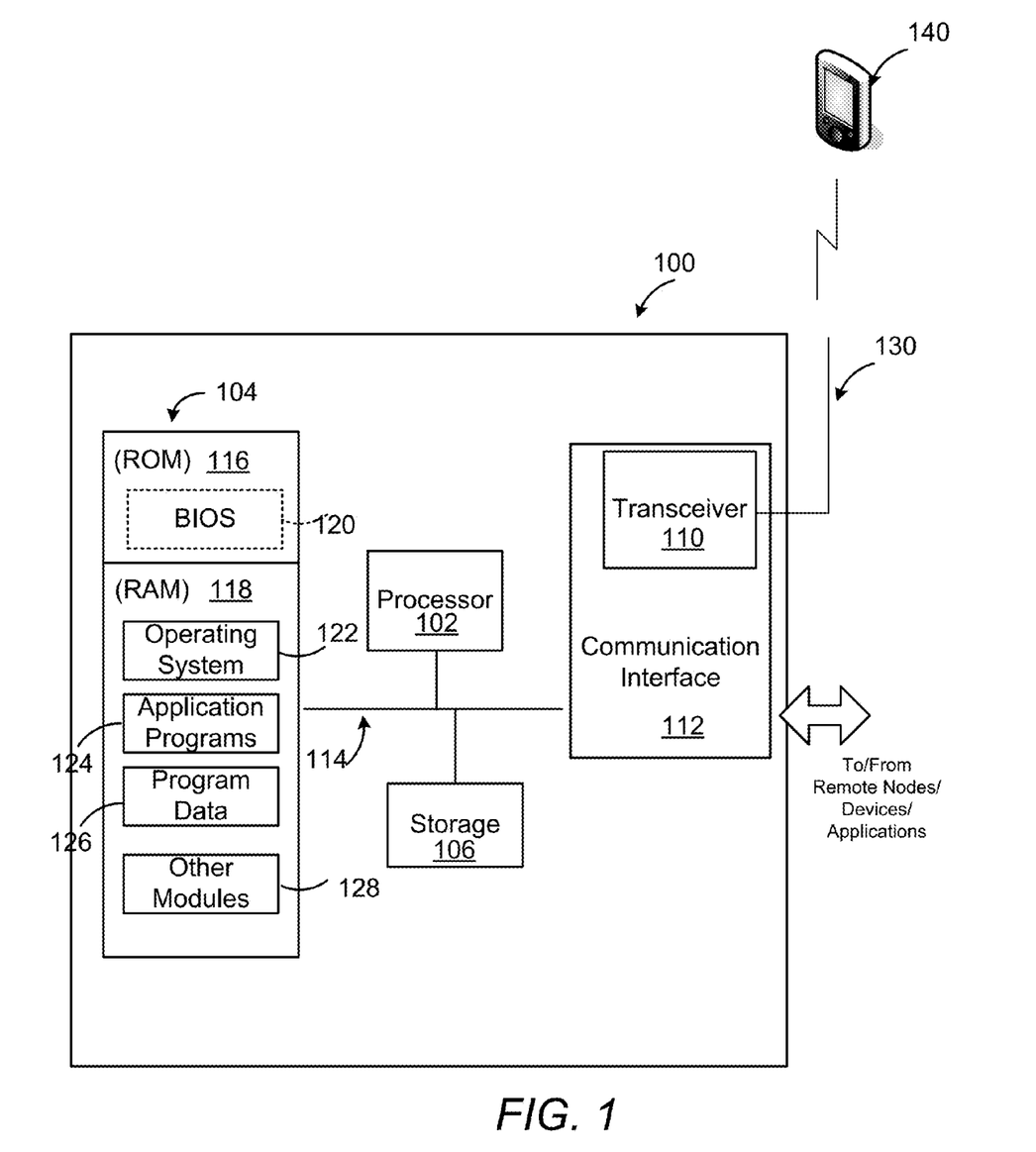
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of a base station and/or C-RAN (not shown) configured to communicate with mobile devices in a communication network. A base station may also be referred to as an eNodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

The hardware device 100 may operate in a networked environment using logical connections to one or more remote nodes via communication interface 112, including communicating with one or more mobile devices via a transceiver 110 connected to an antenna 130. The mobile devices can be dispersed throughout the network 100. A mobile device may be referred to as UE, a terminal, a mobile station, a subscriber unit, or the like. A mobile device may be a cellular phone, a personal digital assistant (PDA), a wireless modem, a wireless communication device, a handheld device, a laptop computer, a wireless local loop (WLL) station, a tablet computer, or the like. A mobile device may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000 , and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). LTE and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies.

Other examples of wireless networks include, for example, a BLUETOOTH network, a wireless personal area network, and a wireless 802.11 local area network (LAN).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 4:
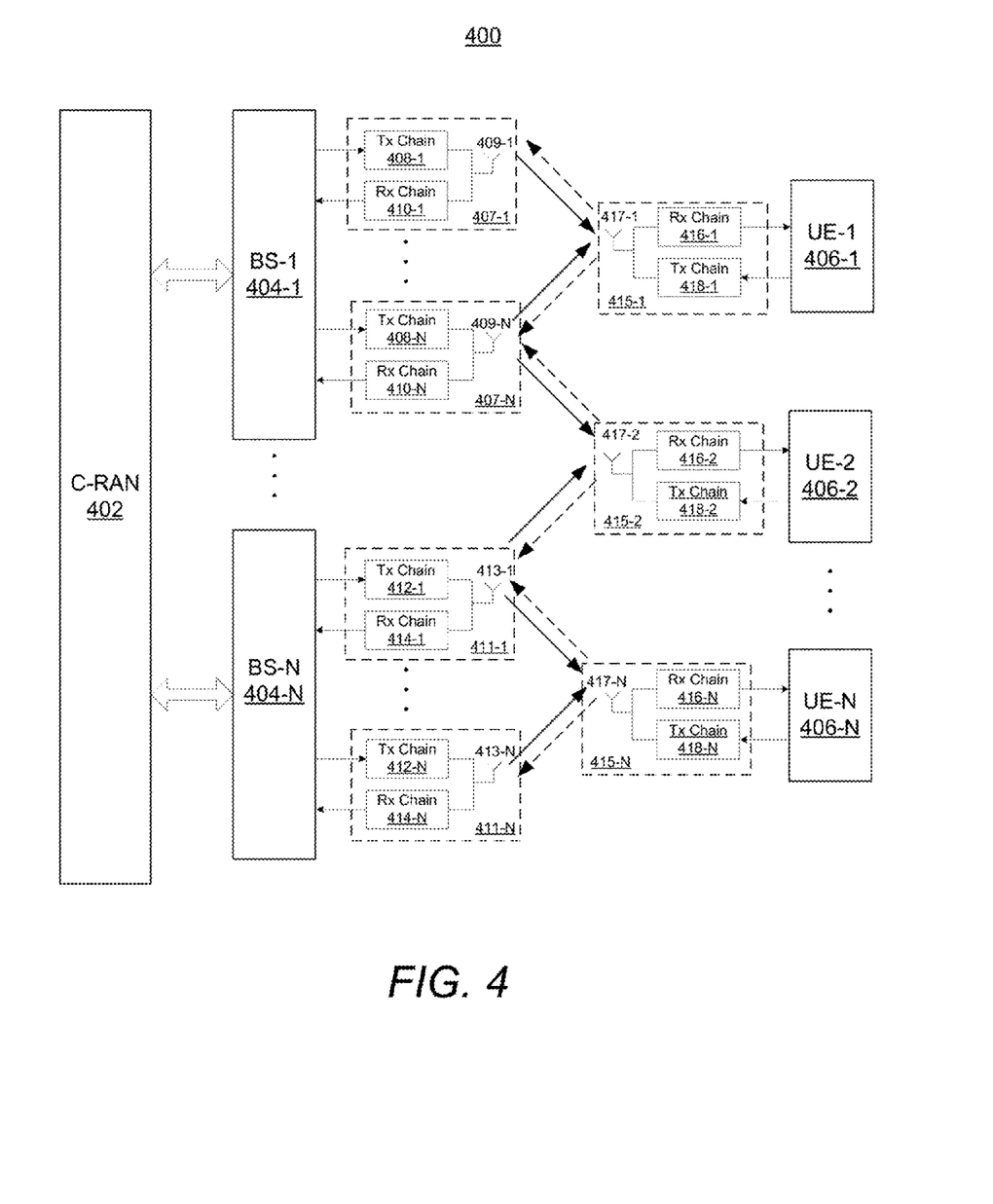
FIG. 4 is a block diagram illustrating a configuration for a MU-MIMO communications system according to another aspect of the subject matter described herein.

FIG. 4 illustrates one configuration for a MU-MIMO communications system 400. The C-RAN 402 communicates with one or more BSs 404-1 to 404-N, which in turn transmit downlink signals (shown with solid lines) to UEs 406-1 to 406-N via BS transmit chains 408-1 to 408-N and 412-1 to 412-N and receive uplink signals (shown with dashed lines) from UEs 406-1 to 406-N via BS receive chains 410-1 to 410-N and 414-1 to 414-N, both via respective associated antennas 409-1 to 409-N and 413-1 to 413-N, correspondingly. UEs 406-1 to 406-N receive downlink signals from BSs 404-1 to 404-N via UE receive chains 416-1 to 416-N and transmit uplink signals to BSs 404-1 to 404-N via UE transmit chains 418-1 to 418-N, both via respective associated antennas 417-1 to 417-N, correspondingly. A transmit chain includes the components necessary to transmit a signal and a receive chain includes all the components necessary to receive a signal. Transmit and receive chains together make up a transceiver chain 407. For example, BS transmit chain 408-1, antenna 409-1, and BS receive chain 410-1 together make up a BS transceiver chain 407-1. Similarly, UE transmit chain 418-1, antenna 417-1, and UE receive chain 416-1 together make up a UE transceiver chain 415-1. As can be appreciated, in a MU-MIMO system, multiple input and out antennas are employed and thus multiple transceiver chains are employed.

Each BS 404 is communicatively coupled to C-RAN 402 such that certain operations may be performed by the BS 404, by the C-RAN 402, or by a combination of both. Each BS 404 may, in some embodiments, be considered a part of the C-RAN 402 such that operations performed at a BS 404 are performed by the C-RAN 402 by extension.

Various operations are described herein with respect to a particular BS 404. It should be understood that these operations may be performed by multiple BS's 404 each with respective or the same UEs 406 and that these multiple operations may be aggregated by the C-RAN 402 for the purposes of power allocation or any other operation described herein.

In order to perform MU-MIMO beamforming for an LTE based C-RAN 402, an accurate estimate of DL-CSI is needed. Generally speaking, DL-CSI can be determined roughly from knowledge of the uplink channel state information (UL-CSI) due to reciprocity between the uplink and downlink air propagation channels. The UL-CSI from UEs 406 to BSs 404 is obtained at the BSs 404 by channel estimation using received sounding reference signal (SRS) symbols. In order to derive an accurate DL-CSI from the UL-CSI, however, compensation for the effects of hardware-induced amplitude distortion that is introduced by transceiver chains at one or more BSs should be considered. The DL CSI is impacted by an amplitude distortion at the transmit chain of the BS 404 and the receive chain of the UE 406. By way of example, respective to BS-1 404-1, the transmit chain 408-1 can introduce amplitude distortion to a signal transmitted downlink via its associated antenna 409-1 and the receive chain 417-1 can introduce an amplitude distortion to a signal received via its associated antenna 409-1. As a result of this hardware-induced amplitude distortion, the downlink pathloss may not be accurately determinable from knowledge of the uplink pathloss. Knowledge of the downlink pathloss, however, can provide an optimal power allocation across UEs as explained below. Accordingly, the amplitude distortion is ideally compensated to improve beamforming accuracy.

Figure 2:
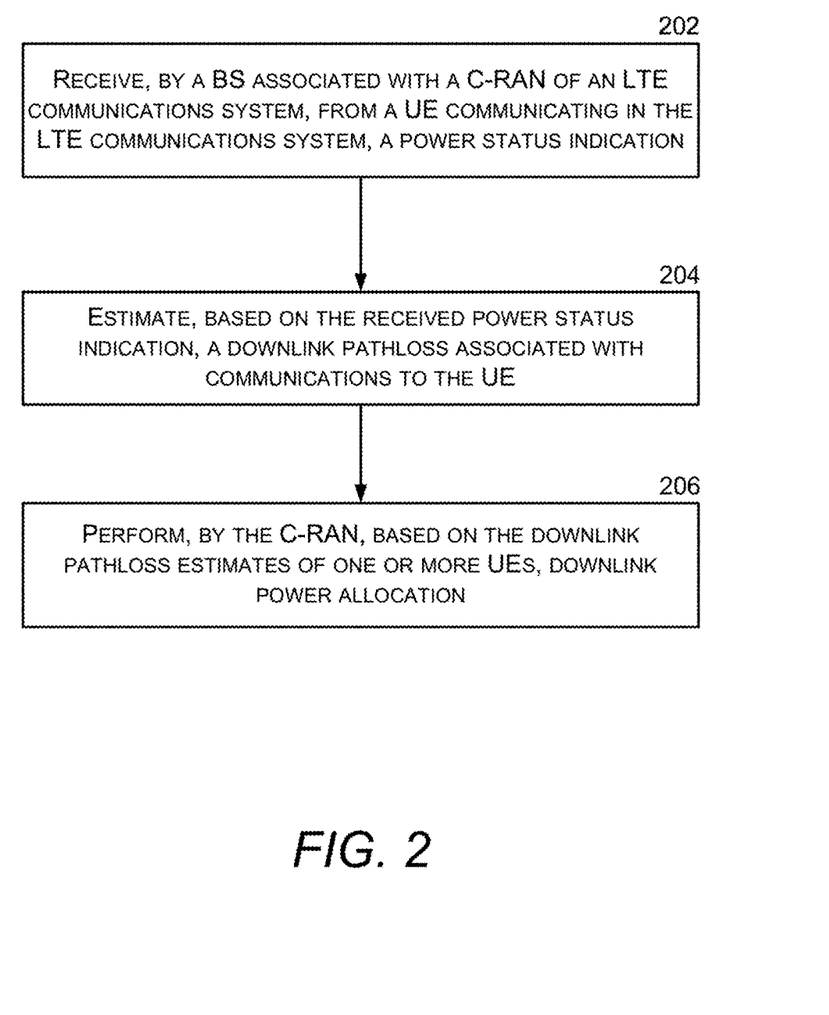
FIG. 2 is a flow diagram illustrating a method for calibrating amplitude hardware-induced distortion in an LTE communications system according to an aspect of the subject matter described herein.
Figure 3:
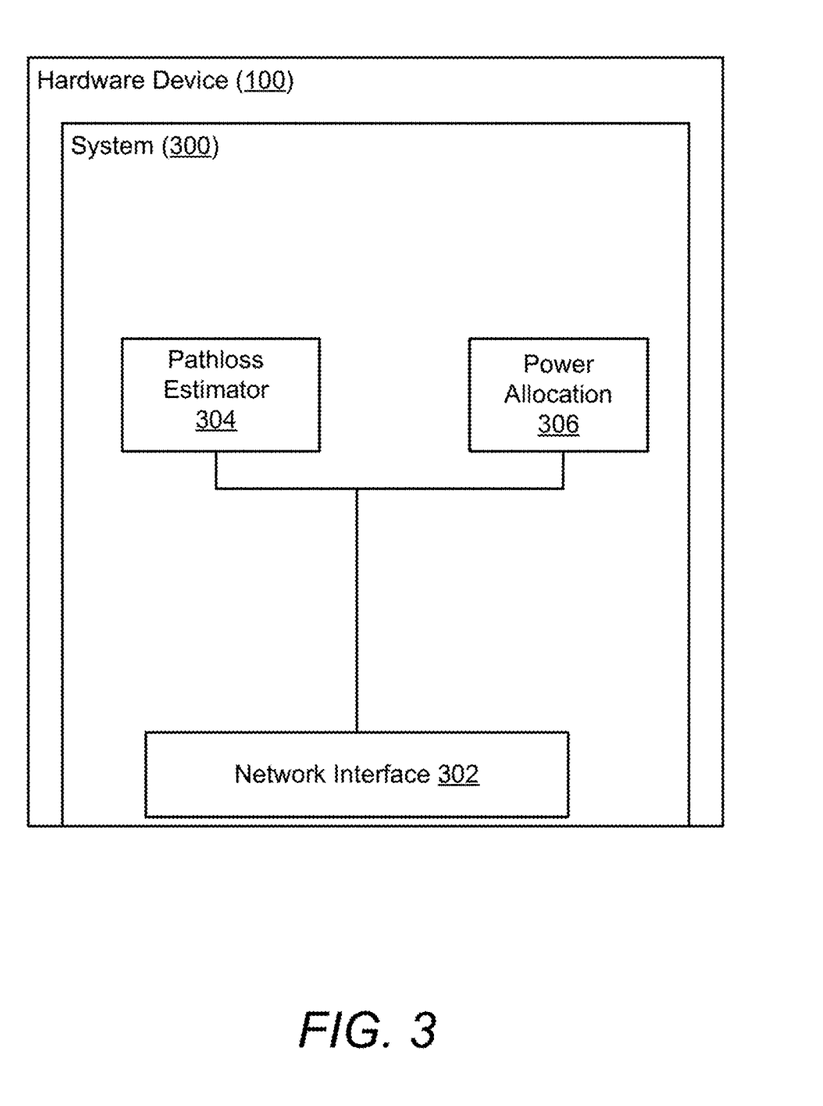
FIG. 3 is a block diagram illustrating an arrangement of components for calibrating amplitude hardware-induced distortion in an LTE communications system according to another aspect of the subject matter described herein.

Turning now to FIG. 2, a flow diagram is shown illustrating a method for calibrating amplitude hardware-induced distortion in an LTE communications system according to an exemplary aspect of the subject matter described herein. FIG. 3 is a block diagram illustrating an arrangement of components for calibrating amplitude hardware-induced distortion in an LTE communications system according to another exemplary aspect of the subject matter described herein. FIG. 1 is a block diagram illustrating an arrangement of components providing an execution environment configured for hosting the arrangement of components depicted in FIG. 3. The method in FIG. 2 can be carried out by, for example, some or all of the components illustrated in the exemplary arrangement in FIG. 3 operating in an a compatible execution environment, such as the environment provided by some or all of the components of the arrangement in FIG. 1. The arrangement of components in FIG. 3 may be implemented by some or all of the components of the hardware device 100 of FIG. 1.

With reference to FIG. 2, in block 202, a power status indication is received at by a BS associated with the C-RAN of an LTE communications system, from a UE communicating in the LTE communications system. Accordingly, a system for calibrating amplitude hardware-induced distortion in an LTE communications system includes means for receiving a power status indication. For example, as illustrated in FIG. 3, a network interface component 302 is configured to receive a power status indication.

In one aspect, the power status indication can include a power headroom report (PHR). Power headroom indicates how much transmission power is left for a UE to use in addition to the power being used by the current transmission. Simply put, power headroom can be described by power control equation (1) (in dB) for physical uplink shared channel (PUSCH) as given below:

$$\text{Power Headroom} = UE_{(Max\ Transmission\ Power)} - UE_{(Expected\ Transmission\ Power)} \quad (1)$$

$$\text{where } UE_{(Expected\ Transmission\ Power)} = P0 + \alpha L + 10\log_{10}(M) + \delta_{MCS} + \mu \quad (2),$$

P0 is the target received power, L is the downlink pathloss estimated by the UE, M is the number of resource blocks assigned for the PUSCH, $\delta_{MCS}$ is modulation and coding specific power offset, p is the inner loop power control steps, and a is a positive scalar less than or equal to 1. The parameters P0, α, M, $\delta_{MCS}$ and μ are configured by the CRAN.

A PHR is typically provided by the UE when a pathloss change is greater than a certain threshold. The UE can calculate the pathloss based on a comparison of reference signal (RS) power value provided by the network and the measured RS power at the UE antenna. If this value changes over a certain threshold, the UE transmits PHR. Alternatively, the UE can periodically provide PHRs.

The PHR is used by the BS to estimate how much uplink bandwidth a UE can use for a specific subframe, since the more resource blocks the UE is using, the higher the UE transmit power.

In another aspect, the power headroom report can include a power headroom value. For example, a power headroom value of (+) indicates the UE still has some space under the maximum power and can therefore transmit more data if allowed to. Inversely, a power headroom value of (−) indicates the UE is expected to transmit at a power level higher than the maximum transmission power the UE supports, which may effectively mean the UE must be assigned a lower bandwidth or lower modulation scheme and coding scheme.

In another aspect, the power headroom report can also include a maximum transmission power of the UE.

In another aspect, the power status indication includes a channel quality indicator (CQI). A CQI is reported by UE and indicates a modulation scheme and coding scheme to the BS that if used the UE would be able to demodulate and decode the transmitted downlink data with a maximum block error rate (BER) of 10%.

Returning to FIG. 2, in block 204 a downlink pathloss associated with communications to the UE is estimated based on the received power status indication. Accordingly, a system for calibrating amplitude hardware-induced distortion in an LTE communications system includes means for estimating, based on the received power status indication, a downlink pathloss associated with communications to the UE. For example, as illustrated in FIG. 3, a pathloss estimator component 304 is configured to estimate, based on the received power status indication, a downlink pathloss associated with communications to the UE.

If the power status indication includes the power headroom report and the maximum transmit power of the UE, the downlink pathloss is estimated by rearranging Eq. (2) as follows:

$$L = (UE_{(Max\ Transmission\ Power)} - \text{Power Headroom} - P0 - 10\log_{10}(M) - \delta_{MCS} - \mu)/\alpha \quad (3)$$

If the power status indication includes only the power headroom report, then the downlink pathloss is estimated based on the sign of the power headroom value. If the power headroom value is positive, then the actual transmit power of the UE is equal to the expected transmit power of the UE. More precisely, using Eq. (2) we obtain:

$$UE_{(Transmit\ Power)} = P0 + \alpha L + 10\log_{10}(M) + \delta_{MCS} + \mu \quad (4)$$

Next, the received power at the BS is given by:

$$BS_{(Receive\ Power)} = UE_{(Transmit\ Power)} - L_{UL} \quad (5)$$

Where $L_{UL}$ is the uplink pathloss. The uplink pathloss and the downlink pathloss are generally approximated to be equal. Therefore, having $L_{UL} = L$, in Eq. (4) and (5), and rearranging all the terms, the downlink pathloss is estimated as $$L = (P0 + 10\log_{10}(M) + \delta_{MCS} + \mu - BS_{(Receive\ Power)})/(1-\alpha) \quad (6)$$

where Eq. (6) can be used only when a is strictly smaller than 1.

It should be noted that UE(Transmit Power) is calculated at the CRAN by plugging L back in Eq. (4). Next, each cell in the CRAN can estimate its pathloss to the UE by computing the difference between received power from that UE and $UE_{(Transmit\ Power)}$ value.

If the power headroom value is negative, then the actual transmit power of the UE is equal to the maximum transmit power of the UE.

$$UE_{(Transmit\ Power)} = UE_{(Max\ Transmission\ Power)} \quad (7)$$

Using the power class of the UE, the maximum transmit power of the UE can be approximated within the tolerance as defined by the 3GPP standard. Either Eq. (3) or Eq. (5) or the combination of both can be used to calculate the downlink pathloss estimate.

In one aspect, the pathloss estimator component 304 can be configured to perform downlink power allocation based on a signal-to-interference-plus-noise ratio (SINR) requirement of at least one of the one or more UEs. A zero-forcing transmit beamformer can be applied first to decompose the multi-user downlink channel into multiple single-user downlink channels, followed by power allocation on each single-user downlink channel to meet the received SINR requirement as per the downlink pathloss corresponding to each UE. On the other hand, power allocation can also be performed to radiate equal power per transmit antenna or limit the maximum radiated power per transmit antenna, while adjusting the modulation and coding scheme assigned to a UE based on its downlink pathloss estimate.

Returning to FIG. 2, in block 206 downlink power allocation is performed by the C_ RAN based on the downlink pathloss estimates of one or more UEs. Accordingly, a system for calibrating amplitude hardware-induced distortion in an LTE communications system includes means for performing, based on the downlink pathloss estimates of one or more UEs, downlink power allocation. For example, as illustrated in FIG. 3, a power allocation component 306 is configured to performing, based on the downlink pathloss estimates of one or more UEs, downlink power allocation.

In one aspect, the pathloss estimator component 304 can be configured to perform downlink power allocation jointly across a plurality of BSs 404 associated with the CRAN 402. For example, the power allocation may be optimized jointly across all the BSs 404 that are in the CRAN 402.

In another aspect, using the downlink pathloss estimate to multiple UEs 406, the power allocation can be performed by iteratively solving a spatial waterfilling algorithm for a Gaussian broadcast channel.

In another aspect, the hardware-induced amplitude distortion can be one of: transmit power settings and a hardware impairment causing attenuation or gain in at least one UE or base station transceiver. The hardware impairment causing attenuation or gain in at least one UE or base station transceiver can be determined based on UE power control parameters, as described above with reference to the pathloss estimation.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for calibrating amplitude hardware-induced distortion in a long term evolution (LTE) communications system, the method comprising:
    receiving, by a first base station (BS) associated with a centralized radio access network (C-RAN) of an LTE communications system, from a user equipment (UE) communicating in the LTE communications system, a power status indication;
    estimating, by the first BS, based on the received power status indication, a first downlink pathloss associated with communications to the UE from the first BS;
    estimating, by a second BS associated with the C-RAN, a second downlink pathloss associated with communications to the UE from the second BS based on the power status indication received by the first BS; and
    performing, by the C-RAN, based on the first and second downlink pathloss estimates of one or more UEs, downlink power allocation;
    wherein at least one of the preceding actions is performed on at least one electronic hardware component.

2. The method of claim 1 wherein receiving a power status indication includes receiving a power headroom report.

3. The method of claim 2 wherein the power headroom report includes a power headroom value.

4. The method of claim 2 wherein the power headroom report includes a maximum transmission power of the UE.

5. The method of claim 3 wherein the power headroom report includes a maximum transmission power of the UE.

6. The method of claim 1 wherein receiving a power status indication includes receiving a channel quality indicator (CQI).

7. The method of claim 1 wherein performing downlink power allocation includes performing downlink power allocation based on a signal-to-interference-plus-noise ratio (SINR) requirement of at least one of the one or more UEs.

8. The method of claim 1 wherein performing downlink power allocation includes performing power allocation jointly across a plurality of BSs associated with the CRAN.

9. The method of claim 1 wherein the hardware-induced amplitude distortion is one of: transmit power settings and a hardware impairment causing attenuation or gain in at least one UE or base station transceiver.

10. The method of claim 8 wherein the hardware impairment causing attenuation or gain in at least one UE or base station transceiver is determined based on UE power control parameters.

11. A system for calibrating amplitude hardware-induced distortion in an LTE communications system, the system comprising a C-RAN of an LTE communications system, the C-RAN comprising system components including:
    means for receiving, by a first BS associated with the C-RAN, from a UE communicating in the LTE communications system, a power status indication;
    means for estimating, by the first BS, based on the received power status indication, a first downlink pathloss associated with communications to the UE from the first BS:
    means for estimating, by a second BS associated with the C-RAN, a second downlink pathloss associated with communications to the UE from the second BS based on the power status indication received by the first BS; and
    means for performing, by the C-RAN, based on the first and second downlink pathloss estimates of one or more UEs, downlink power allocation;
    wherein at least one of the means includes at least one electronic hardware component.

12. A system for calibrating amplitude hardware-induced distortion in an LTE communications system, the system comprising a C-RAN of an LTE communications system, the C-RAN comprising system components including:
    a network interface component associated with a first BS associated with the C-RAN and configured to receive from a UE communicating in the LTE communications system, a power status indication;
    a pathloss estimator component associated with the first BS and configured to estimate based on the received power status indication, a first downlink pathloss associated with communications to the UE from the first BS; and
    a pathloss estimator component associated with a second BS associated with the C-RAN and configured to estimate a second downlink pathloss associated with communications to the UE from the second BS based on the power status indication received by the first BS; and
    a power allocation component configured to perform, based on the first and second downlink pathloss estimates of one or more UEs, downlink power allocation;
    wherein at least one of the system components includes at least one electronic hardware component.

13. The system of claim 12 wherein the power status indication includes a power headroom report.

14. The system of claim 13 wherein the power headroom report includes a power headroom value.

15. The system of claim 13 wherein the power headroom report includes a maximum transmission power of the UE.

16. The system of claim 14 wherein the power headroom report includes a maximum transmission power of the UE.

17. The system of claim 12 wherein the power status indication includes a CQI.

18. The system of claim 12 wherein one or more of the associated pathloss estimator component is configured to perform downlink power allocation by performing downlink power allocation based on a signal-to-interference-pus-noise ratio (SINR) requirement of at least one of the one or more UEs.

19. The system of claim 12 wherein one or more of the associated pathloss estimator component is configured to perform downlink power allocation jointly across a plurality of BSs associated with the CRAN.

20. The system of claim 12 wherein the hardware-induced amplitude distortion is one of: transmit power settings and a hardware impairment causing attenuation or gain in at least one UE or base station transceiver.

21. The system of claim 20 wherein the hardware impairment causing attenuation or gain in at least one UE or base station transceiver is determined based on UE power control parameters.

22. A non-transitory computer readable medium storing a computer program, executable by a machine, for calibrating amplitude hardware-induced distortion in an LTE communications system, the computer program comprising executable instructions for:
    receiving, by a first base station (BS) associated with a centralized radio access network (C-RAN) of an LTE communications system, from a user equipment (UE) communicating in the LTE communications system, a power status indication;
    estimating, by the first BS, based on the received power status indication, a first downlink pathloss associated with communications to the UE from the first BS;
    estimating, by a second BS associated with the C-RAN, a second downlink pathloss associated with communications to the UE from the second BS based on the power status indication received by the first BS; and
    performing, by the C-RAN, based on the first and second downlink pathloss estimates of one or more UEs, downlink power allocation.

* * * * *